(12) United States Patent
Frisch

(10) Patent No.: US 8,341,873 B2
(45) Date of Patent: Jan. 1, 2013

(54) PORTABLE INSECT TRAP

(75) Inventor: Steven Frisch, Brooklyn, NY (US)

(73) Assignee: APeG Co., Inc., Brooklyn, NY (US)

( * ) Notice: Subject to any disclaimer, the term of this patent is extended or adjusted under 35 U.S.C. 154(b) by 227 days.

(21) Appl. No.: 12/407,285

(22) Filed: Mar. 19, 2009

(65) Prior Publication Data

US 2010/0236133 A1 Sep. 23, 2010

(51) Int. Cl.
*A01M 1/08* (2006.01)
(52) U.S. Cl. ............................. 43/113; 43/114
(58) Field of Classification Search .................. 43/113, 43/114

See application file for complete search history.

(56) References Cited

U.S. PATENT DOCUMENTS

| 2,468,227 | A | * | 4/1949 | Nagel | 43/113 |
| 5,425,197 | A | * | 6/1995 | Smith | 43/113 |
| 6,108,966 | A | * | 8/2000 | Otomo et al. | 43/113 |
| 6,161,327 | A | * | 12/2000 | Thomas | 43/115 |
| 6,560,918 | B2 | * | 5/2003 | Nelson | 43/112 |
| 6,718,687 | B2 | * | 4/2004 | Robison | 43/114 |
| 2002/0073611 | A1 | * | 6/2002 | Greening | 43/113 |
| 2003/0089024 | A1 | * | 5/2003 | Nelson et al. | 43/113 |
| 2005/0166445 | A1 | * | 8/2005 | Lambert et al. | 43/113 |
| 2006/0107583 | A1 | * | 5/2006 | Wu | 43/113 |

* cited by examiner

*Primary Examiner* — Christopher P Ellis
(74) *Attorney, Agent, or Firm* — Malina & Associates, PLLC

(57) ABSTRACT

A portable insect trap includes a base which supports a pair of lamps and a removable double sided glue board which is removably mounted between the lamps. A shield which has apertures in the form of a grill work allows insects which are attracted by the lamps to enter the shield and then become trapped by adhesive layers on the glue board.

8 Claims, 7 Drawing Sheets

PORTABLE INSECT TRAP

FIELD OF THE INVENTION

The present invention relates generally to the filed of apparatus for insect control and more particularly, to a portable insect trap.

BACKGROUND OF THE INVENTION

The prior art includes various examples of insect traps which use lamps with a special spectrum which generally extends into the ultra violet range and an electrical discharge to kill insects which have entered the trap. While generally effective in trapping and killing insects, these prior art devices can be used in fixed locations. These prior art devices are connected to a source of electrical power and cannot be used as portable devices in outdoor locations and during activities such as camping trips where the presence of large numbers of insects has a negative impact on the enjoyment of the activity.

In addition to being limited to a fixed location, the prior art insect traps which utilize an electrical discharge to kill insects, are objectionably noisy, result in a need to periodically clean insect parts from the trap, and they are unsanitary because the insect particles disintegrate.

OBJECTS AND SUMMARY OF THE INVENTION

It is an object of the present invention to provide a portable insect trap which incorporates a visual lamp, an ultra violet lamp, and a glue board.

Another object of the present invention is to provide a portable insect trap which incorporates a removable glue board.

Another object of the present invention is to provide a portable insect trap which is relatively light in weight.

Another object of the present invention is to provide a portable insect trap in which a glue board can be removed and replaced easily and quickly.

Yet another object of the present invention is to provide a portable insect trap which has a small number of simple component parts which can be manufactured economically in volume resulting in a relatively low unit cost.

Other objects and a more complete understanding of the present invention will be made clear hereinafter.

In accordance with the present invention, there is provided a portable insect trap which includes a housing which encloses a battery and electrical connectors which support and power a pair of lamps. The lamps and a glue board holder are mounted inside a grill which has a plurality of apertures which allow insects which are attracted by the lamps to contact and become trapped by the glue board. The glue board is double-sided and has a layer of adhesive on both sides of a substrate.

Additional objects, features and advantages of the invention will be apparent from the following detailed description when taken in conjunction with the accompanying drawings.

DETAILED DESCRIPTION OF THE INVENTION

Figure 1:
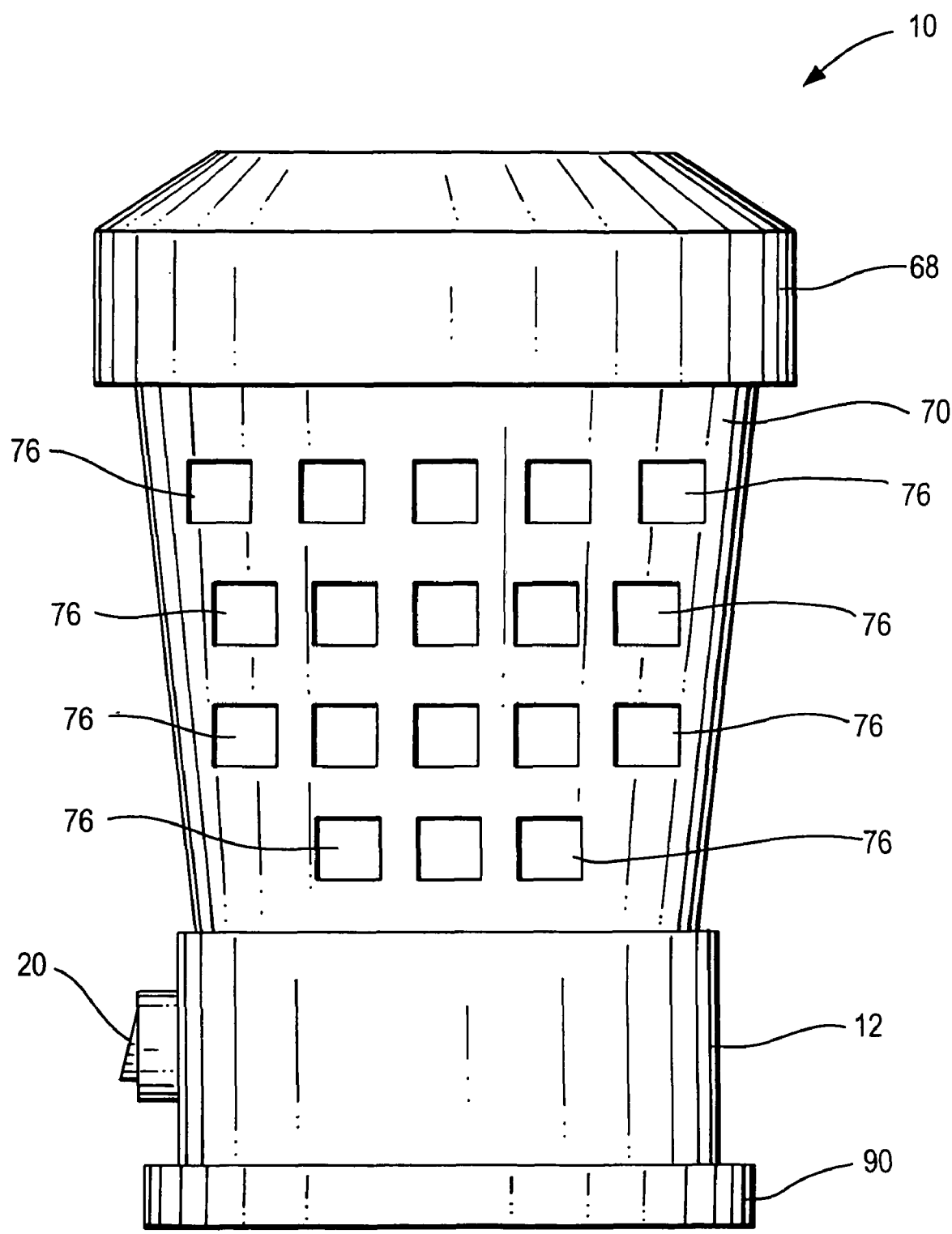
FIG. 1 is an elevation view of a portable insect trap made according to the present invention.

A portable insect trap 10 made according to the present invention is shown in FIGS. 1-5 and includes a hollow base 12 which encloses a set of rechargeable batteries 14, and which supports a pair of lamp sockets 16, 18 and switch 20 and electrical circuit connections 24 which connect the rechargeable batteries 14, the lamp sockets 16, 18 and the switch 20 to provide power to the lamp sockets 16, 18 in a conventional manner. The top plate 26 of the base 12 supports the lamp sockets 16, 18 and a glue board holder 28, which forms a key feature of the present invention.

Figure 2:
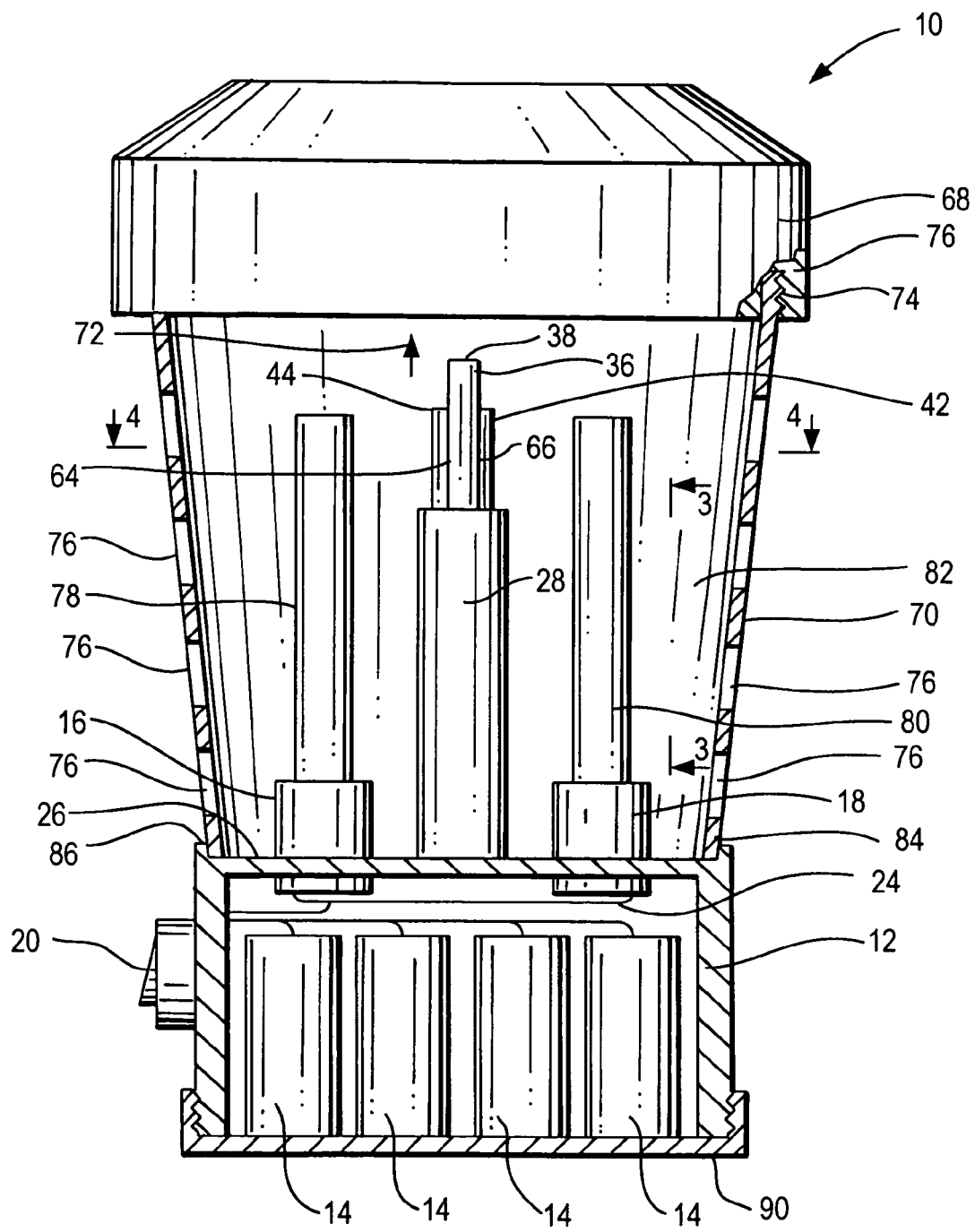
FIG. 2 is a vertical schematic sectional view of the portable insect trap of FIG. 1.
Figure 3:
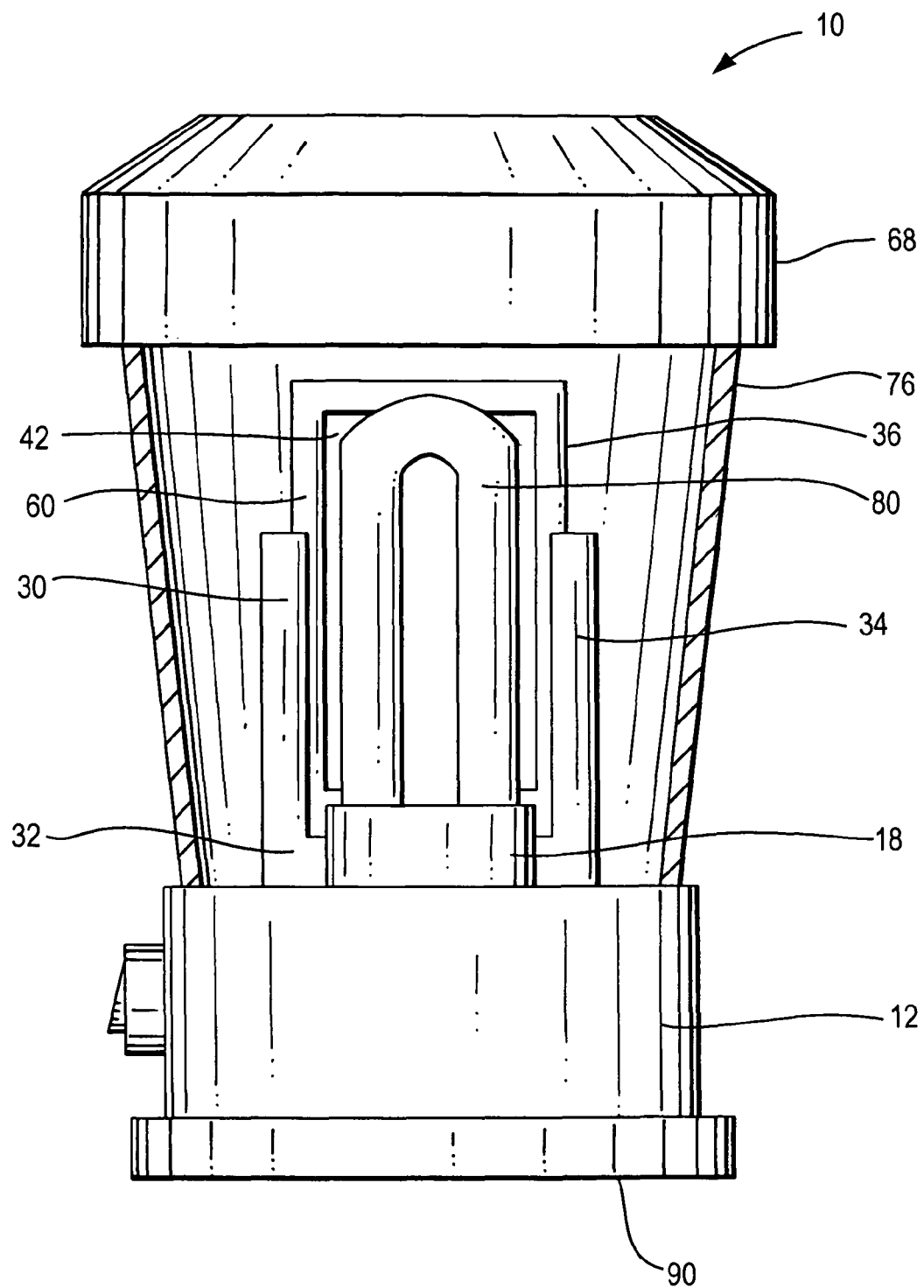
FIG. 3 is a cross-sectional view taken along the line 3-3 of FIG. 2.
Figure 4:
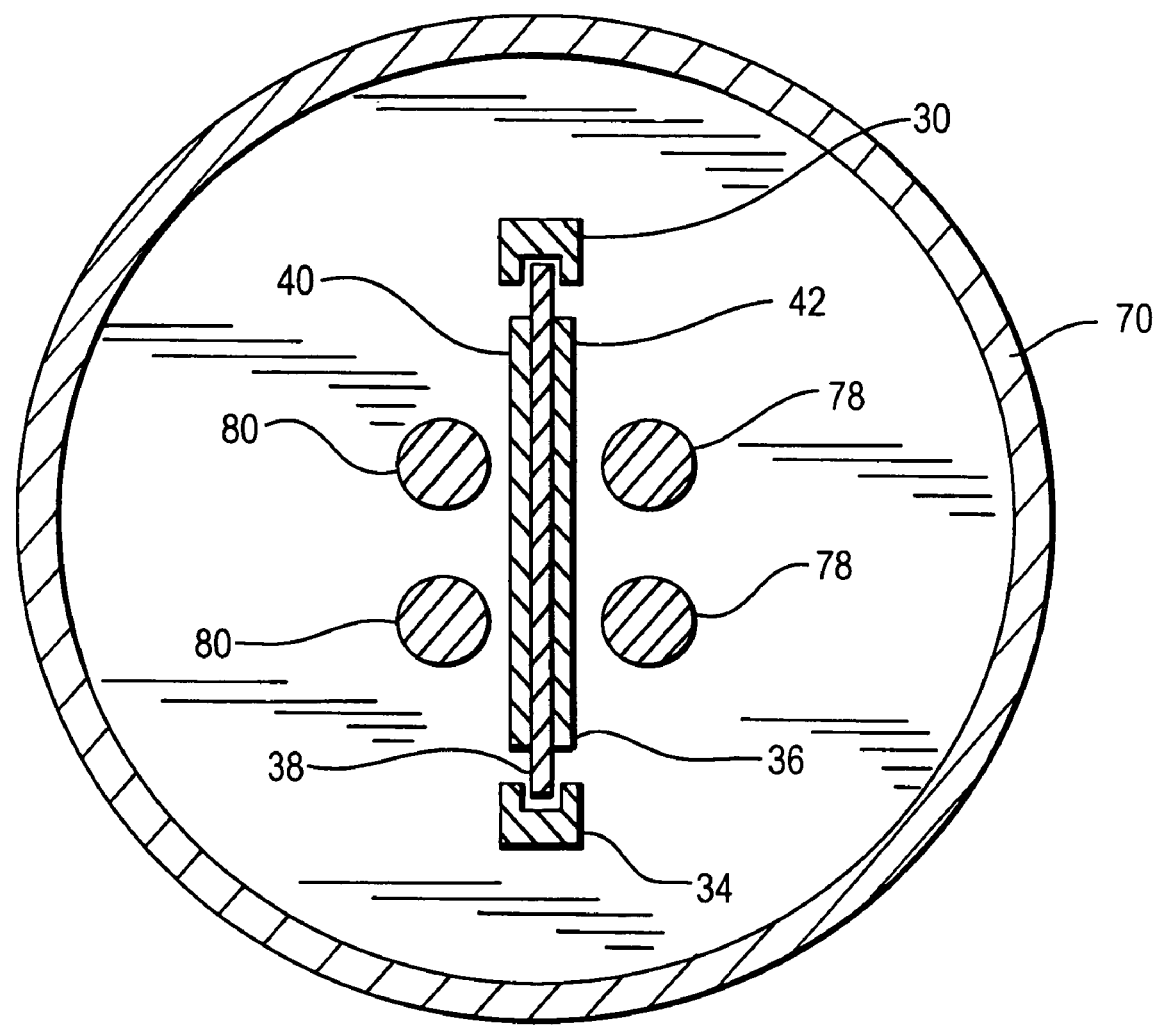
FIG. 4 is a cross-sectional view taken along the line 4-4 of FIG. 2.
Figure 5:
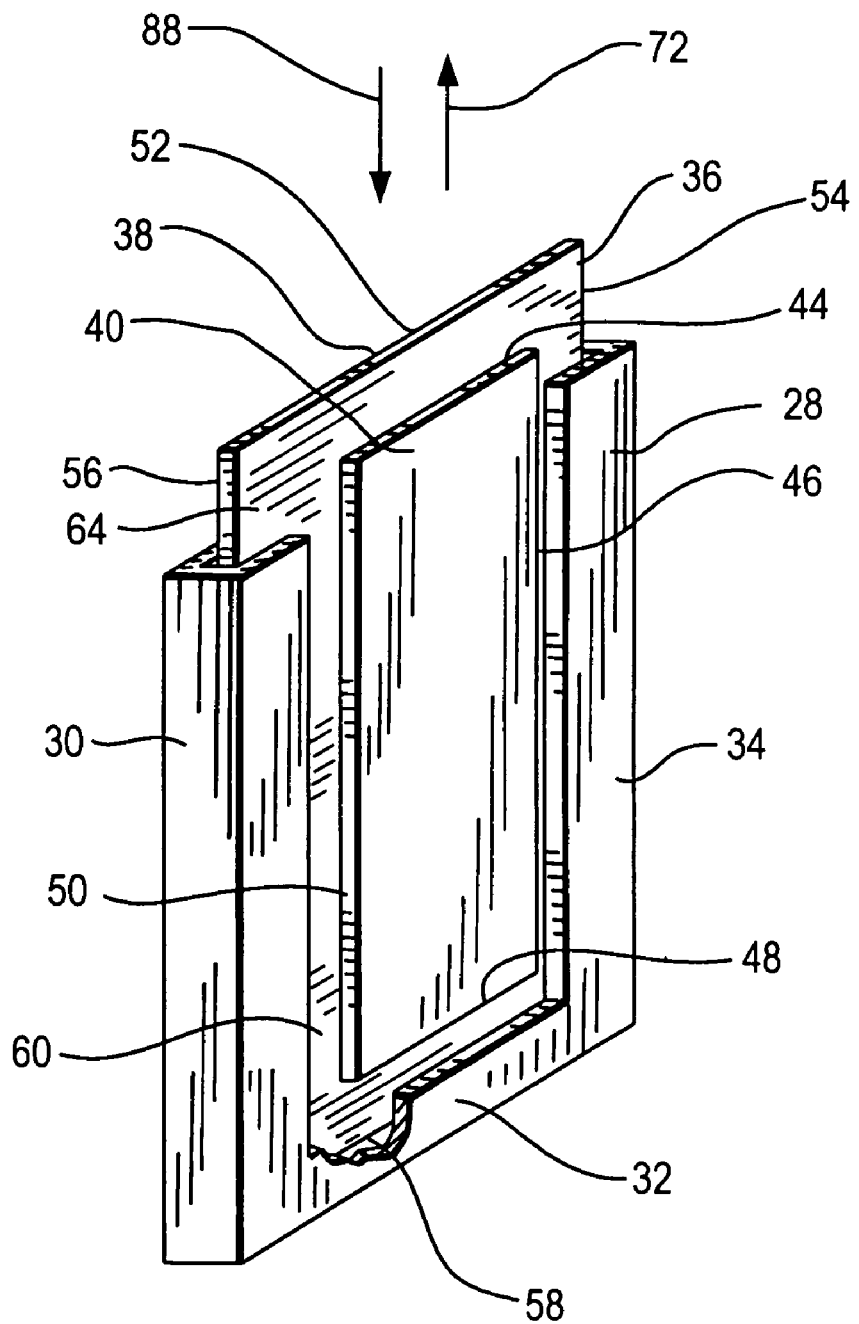
FIG. 5 is a perspective view of the double sided glue board and the glue board holder.

The glue board holder 28 is best shown in FIGS. 2, 4 and 5 and includes three portions 30, 32, 34 each of which has a generally U-shaped cross-section. The glue board holder 28 supports a double-sided glue board 36 which includes a substrate 38 and a pair of non-drying adhesive layers 40, 42. The edges 44, 46, 48, 50 of the adhesive layers 40, 42 are spaced away from the edges 52, 54, 56, 58 of the substrate 38 leaving an adhesive free border 60, 62. Each of the sides 64, 66 of the substrate 38 adhesive free borders 60, 62 prevents the adhesive layers 40, 42 from adhering to the glue board holder 28 and allows a user to easily remove and replace the glue board 36.

The glue board 36 may be removed by unscrewing the top cover 68 from the shield 70 and pulling the glue board 36 in the direction shown by the arrow 72 in FIGS. 2 and 5 to slide the glue board 36 out of the glue board holder 28. The used glue board 36 along with the insects trapped on the adhesive layers 40, 42 may be disposed of in a convenience and hygienic manner.

The shield 70 includes a threaded portion 74 which engages a corresponding threaded portion 76, the top cover 68, and a plurality of apertures 76 which form a grill work. The apertures 76 allow insects which are attracted by the lamps 78, 80 to enter the space 82 inside the shield 70.

As the insects fly toward the lamps 78, 80, the insects become trapped by the adhesive layers 40, 42. The shield 70 may preferably be manufactured of a clear plastic which provides illumination for a user in the manner of a conventional camping lantern while attracting and trapping insects as described above.

The bottom portion 84 of the shield 70 may be attached to the hollow base 12 by an adhesive layer 86 in a conventional manual. A replacement glue board 36 may be easily inserted into the glue trap holder 28 by sliding it in the direction shown by the arrow 88 in FIG. 5.

As is best shown in FIG. 4, the adhesive layers 40, 42 of the glue trap 36 are disposed relatively close to the fluorescent lamps 78, 80. This relative close positioning of the lamps 78, 80 and the adhesive layers 40, 42 enhances the performance of the portable insect trap 10. As the insects who are strongly attracted to the lamps 78, 80 and the adhesive layers 40, 42 enhances the performance of the portable insect trap 10. As the insects who are strongly attracted to the lamps 78, 80 fly past the lamps 78, 80, the momentum of their flight causes to strike the adhesive layers 40, 42 and become trapped. The close spacing of the adhesive layers 40, 42 and the lamps 78, 80 minimizes the chance of the insects escaping the portable insect trap 10.

The hollow base 12 includes a bottom cover 90 which may be removed to replace the batteries 14. The lamps 78, 80 may be ultra-violet lamps or fluorescent lamps 78, 80 which have an emission spectrum which includes emission in the ultra-violet region as well as emission in the visible light region.

Figure 6:
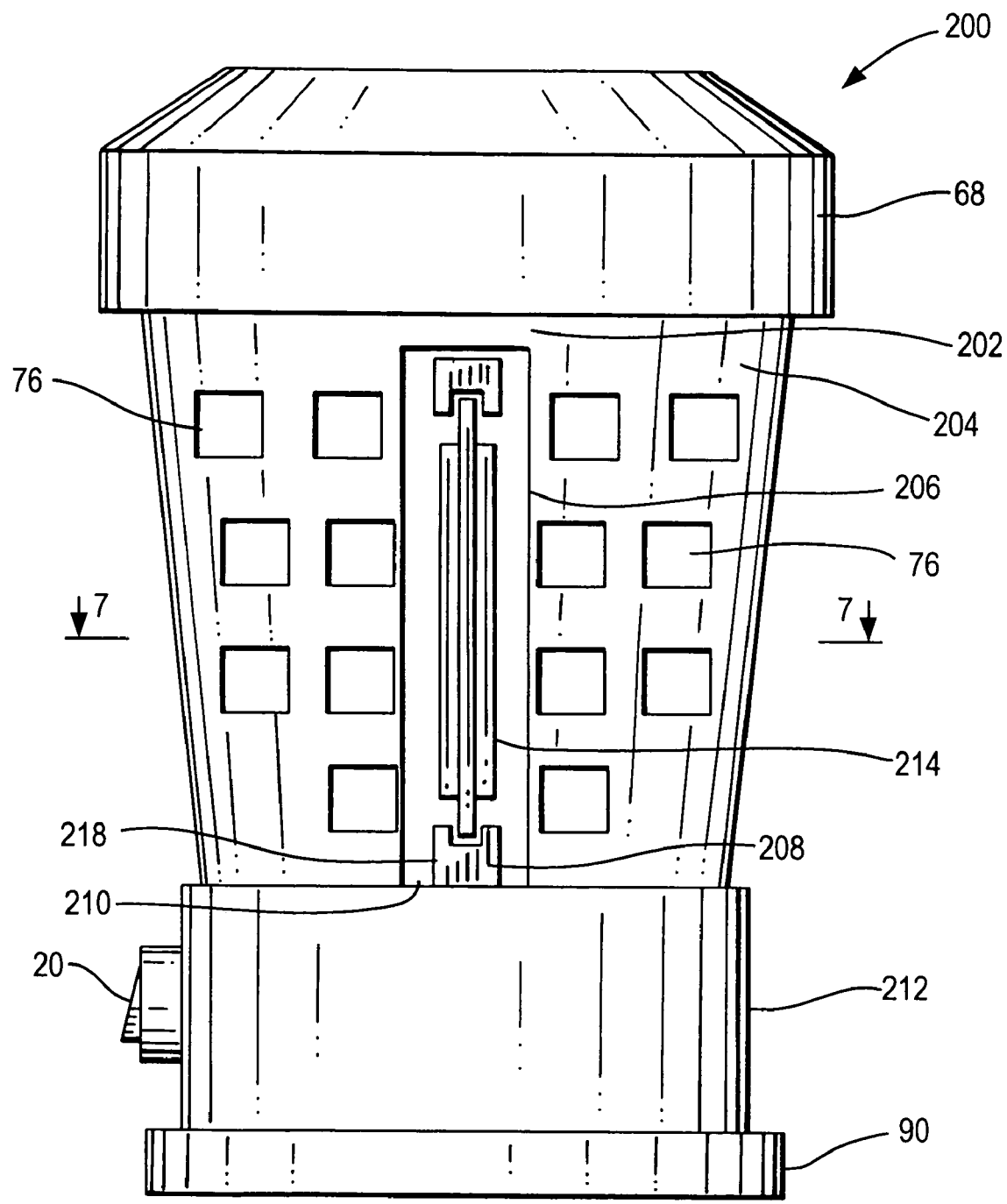
FIG. 6 is an elevation view of an alternative embodiment of the invention in which the double sided glue board is inserted in a horizontal direction.
Figure 7:
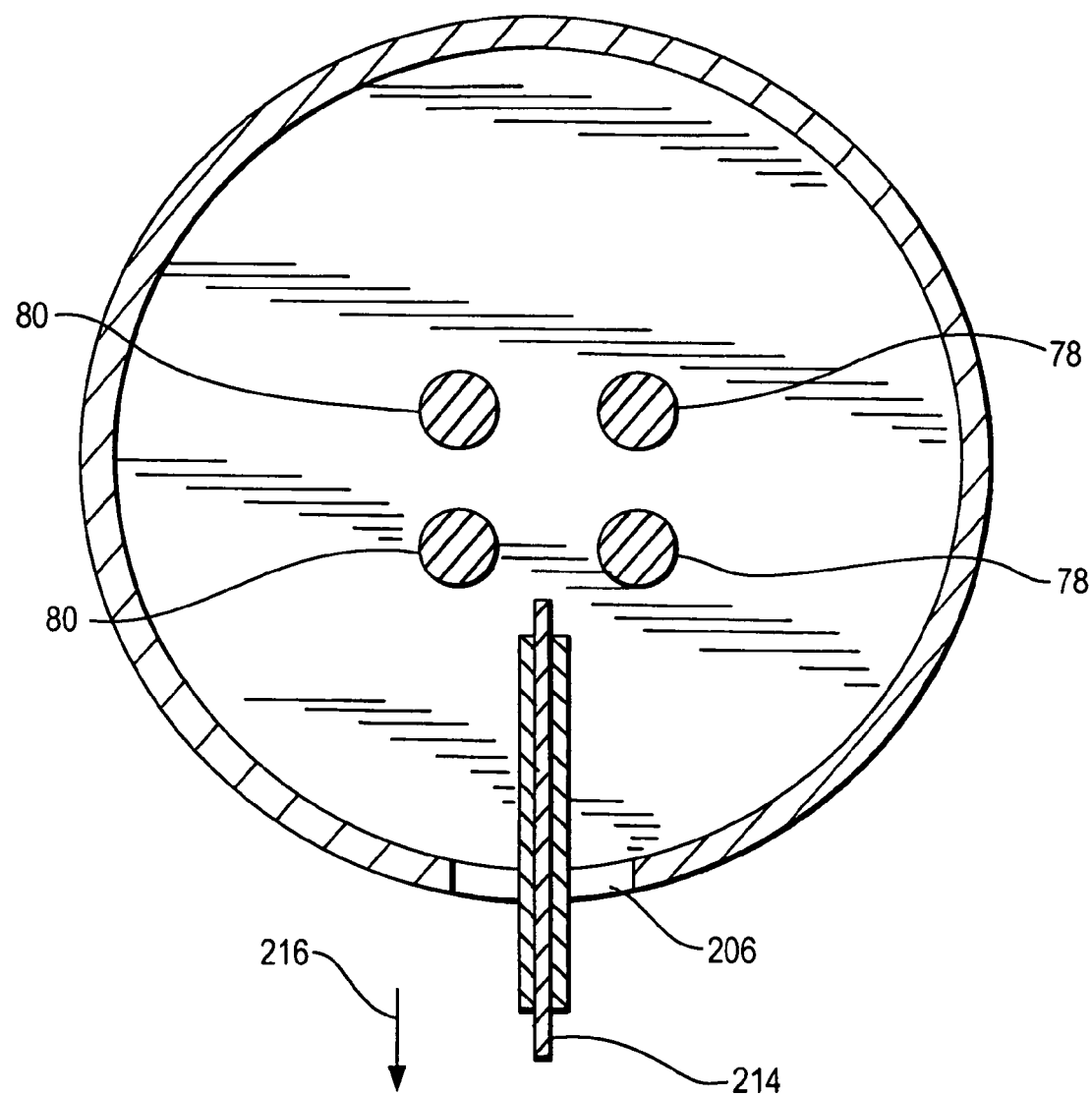
FIG. 7 is a fragmentary cross-sectional view taken along the line 7-7 in FIG. 6 showing the double sided glue board being removed.

FIG. 6 and 7 show an alternate embodiment of the invention 200 in which a portion 202 of the shield 204 incorporates a vertical slot 206. The glue board holder 208 is mounted on the top plate 210 of the hollow base 212 as is shown in FIG. 5. The double sided glue board 214 may be removed by sliding the glue board 214 out of the shield 204 in a horizontal manner shown by the arrow 216 and as is shown schematically in FIG. 6. The double sided glue board 214 is similar to the glue board 36 previously described and the glue board holder 208 is similar to the glue board holder 28 previously described with the portion 218 which is similar to the portion 30 mounted on the base 212.

The foregoing specific embodiments of the present invention as set forth in the specification herein are for illustrative purposes only. Various deviations and modifications may be made within the spirit and scope of this invention, without departing from a main theme thereof.

What is claimed is:

1. A portable insect trap comprising:
   a hollow base;
   at least one battery, disposed in said base;
   a hollow transparent shield mounted on said base, with said transparent shield having a plurality of apertures;
   a pair of U-shaped lamps mounted on said base and disposed inside said transparent shield;
   electrical connections connecting said at least one battery and said pair of U-shaped lamps;
   a glue board disposed within said shield with said glue board comprising a substrate having a front surface and a rear surface and a first adhesive layer disposed on said front surface and a second adhesive layer disposed on said rear surface, and said glue board being disposed between said pair of U-shaped lamps.

2. A portable insect trap as claimed in claim 1 further comprising:
   a removable top cover mounted on said shield.

3. A portable insect trap as claimed in claim 1 further comprising:
   a glue board holder disposed on said base and disposed removably holding said glue hoard.

4. A portable insect trap as claimed in claim 2 wherein said substrate comprises:
   substrate peripheral edges; and
   wherein said first adhesive layer and said second adhesive layer each comprise:
   adhesive layer peripheral edges and wherein said adhesive layer peripheral edges are spaced inwardly relative to said substrate peripheral edges.

5. A portable insect trap as claimed in claim 1 wherein said transparent shield comprises:
   a slotted portion disposed to provide access to said glue board.

6. A portable insect trap as claimed in claim 1 further comprising:
   a removable bottom cover mounted on said hollow base.

7. A portable insect trap as claimed in claim 3 wherein said glue board substrate is slideably mounted in said glue board holder.

8. A portable insect trap as claimed in claim 1 wherein each lamp of the pair of U-shaped lamps is characterized by a major plane, the major plane being parallel to a major plane of the glue board.

\* \* \* \* \*